United States Patent [19]
Boyd et al.

[11] Patent Number: 5,131,812
[45] Date of Patent: Jul. 21, 1992

[54] AIRCRAFT ENGINE PROPULSOR BLADE DEICING

[75] Inventors: Linda S. Boyd, Granby, Conn.; James M. Dolan, Ludlow; James A. Cook, Agawam, both of Mass.

[73] Assignee: United Technologies Corporation, Hartford, Conn.

[21] Appl. No.: 680,600

[22] Filed: Apr. 1, 1991

Related U.S. Application Data

[63] Continuation of Ser. No. 502,392, Mar. 30, 1992, abandoned.

[51] Int. Cl.$^5$ ............................................. B64D 15/00
[52] U.S. Cl. .................................. 416/95; 244/134 D
[58] Field of Search .............. 416/95, 39; 244/134 R, 244/134 D; 219/201, 202, 548, 549

[56] References Cited

U.S. PATENT DOCUMENTS

| | | | |
|---|---|---|---|
| 2,084,556 | 6/1957 | Hamilton | 244/134 D |
| 2,496,279 | 2/1950 | Ely et al. | 244/134 D X |
| 2,503,457 | 4/1950 | Speir et al. | 244/134 D X |
| 2,552,075 | 5/1951 | Van Daam | 244/134 D |
| 2,599,059 | 6/1952 | Jones | 244/134 D |
| 2,743,890 | 5/1956 | LaRue | 244/134 D |
| 4,386,749 | 6/1983 | Sweet et al. | 244/134 D |

*Primary Examiner*—Edward K. Look
*Assistant Examiner*—James A. Larson
*Attorney, Agent, or Firm*—Donald W. Muirhead; Patrick J. O'Shea

[57] ABSTRACT

A blade heater (10) for an aircraft engine propulsor blade (14) has a foil pattern (18) which is comprised of a plurality of elements (25-56). The resistance of the elements (25-56) varies according to the distance between the elements (25-56) and the leading edge (12) of the blade (14).

4 Claims, 2 Drawing Sheets

AIRCRAFT ENGINE PROPULSOR BLADE DEICING

This is a continuation of Ser. No. 502,392, Mar. 30, 1990, abandoned.

TECHNICAL FIELD

This invention relates to electrical heating and more particularly to electrical heating for deicing aircraft engine propulsor blades.

BACKGROUND ART

In-flight aircraft engine propulsor blade deicing is necessary because the formation of ice on the blades decreases the amount of engine thrust. Electrical heating elements attached to the blade are used to heat the blade surface, thereby melting ice which forms thereon. The ice is thrown from the blade by the centrifugal force generated by the rotating propulsor.

The elements are comprised of a relatively thin, continuous, resistive metallic material (foil) which is laid out into a pattern and fixedly attached to a sheet of nylon which is fixedly attached to a sheet of neoprene, thereby forming a blade heater which is bonded to the blade. The resistive elements generate heat when electric power is applied.

Power for the blade heater comes from an aircraft electrical generator. Since it is desirable to decrease the cost and size of the generator, it is desirable to minimize the amount of power drawn by the blade heater while still effectively deicing the blades The power consumed by the blade heater is reduced by reducing the size of the heater so that only the radially inward most portion of the blade is heated. The centrifugal force at the radially outward most portion of the blade is sufficient for deicing without applying heat. Furthermore, since the majority of ice formation occurs at the leading edge (i.e. the edge of the blade which turns into the ambient air), the size of the heater, and hence the power consumed, can be further reduced by having the heater cover portions of the blade near the leading edge.

A further power reduction is obtained by decreasing the amount of heat generated by the radially outward most portion of the heater by decreasing the resistance of the radially outward most elements. The centrifugal force, which throws ice from the blades, is greater at the radially outward most portions so that less heat is required.

DISCLOSURE OF INVENTION

Objects of the invention include reducing the amount of power required to effectively deice an aircraft engine propulsor blade.

According to the present invention, a blade heater for deicing aircraft engine propulsor blades has a plurality of elements electrically attached exclusively to both circumferentially and radially adjacent ones of said elements.

The foregoing and other objects, features and advantages of the present invention will become more apparent in light of the following detailed description of exemplary embodiments thereof, as illustrated in the accompanying drawings.

BEST MODE FOR CARRYING OUT THE INVENTION

Figure 1:
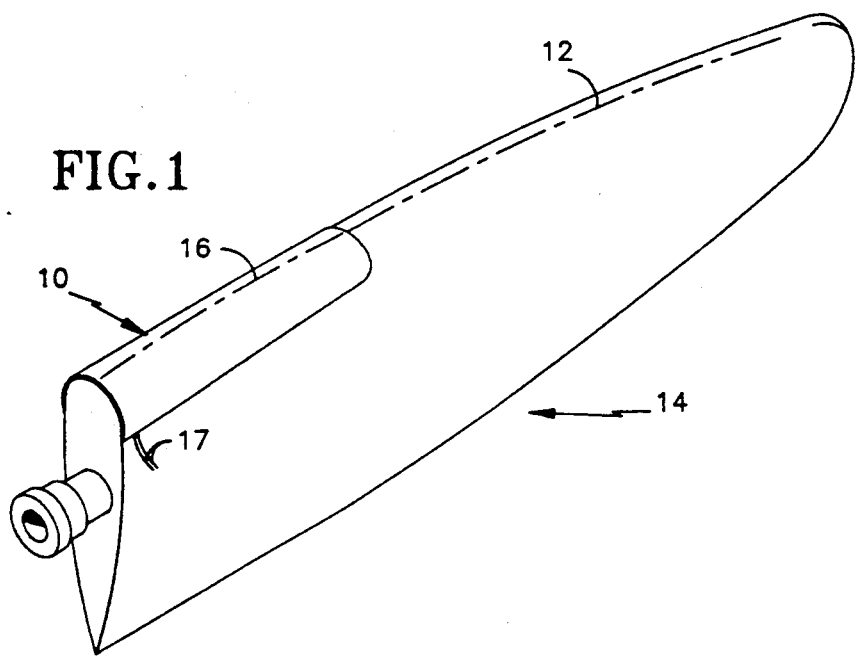
FIG. 1 is a perspective view of an aircraft engine propulsor blade having a heater attached thereto.

Referring to FIG. 1, a blade heater 10 is fixedly attached to an aircraft engine propulsor blade 14. A lead axis 16 of the heater 10 is aligned with the leading edge 12 of the blade 14 (i.e. the forward most portion of the blade 14 which turns into the ambient air). Power from an electrical generator (not shown) is supplied to the heater 10 via a pair of heater lead wires 17.

Figure 2:
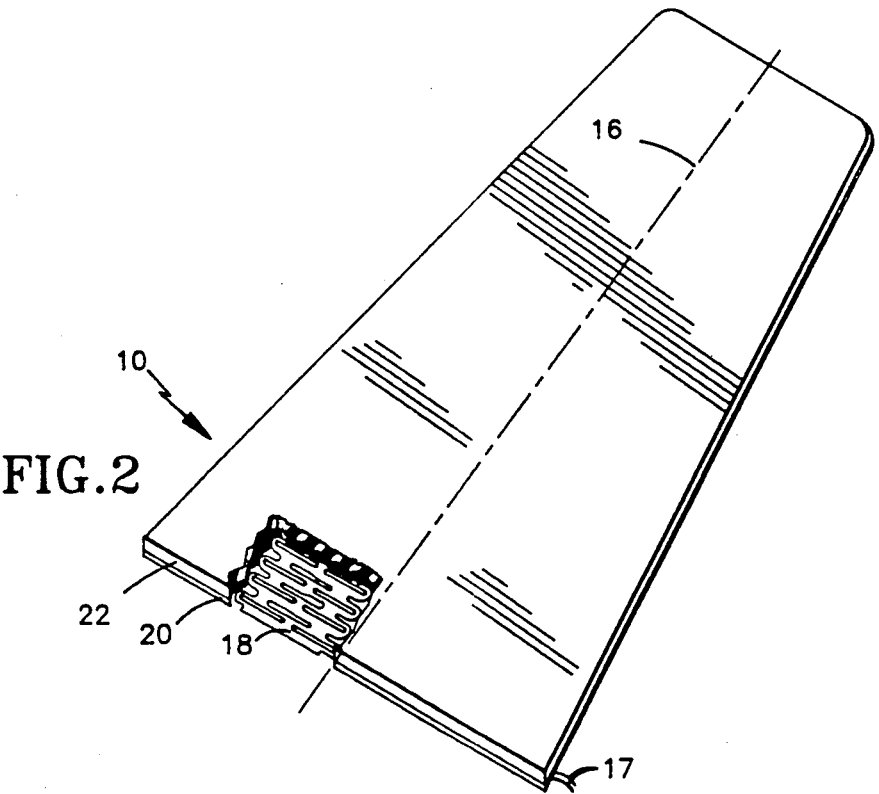
FIG. 2 is a perspective view partly broken away and partly in section of a blade heater according to the invention.

Referring to FIG. 2, the blade heater 10 is comprised of a 0.002 inch thick foil pattern 18, a 0.007 inch thick nylon sheet 20, and a 0.025 inch thick neoprene sheet 22. The foil pattern 18, which is comprised of a copper-nickel alloy having 45 percent copper and 55 percent nickel, is bonded to one side of the nylon sheet 20 by means known to those skilled in the art. The neoprene sheet 22 is bonded to the other side of the nylon sheet 20 by means known to those skilled in the art. The nylon sheet 20 is used primarily for mechanically reinforcing the foil pattern 18 while the neoprene sheet 22 provides erosion protection for the heater 10. During the manufacturing process, the foil pattern 18 side of the heater 10 is folded over and bonded to the blade 14 using a commercially available, electrically non-conductive, epoxy, such as Bostik 1096.

Figure 3:
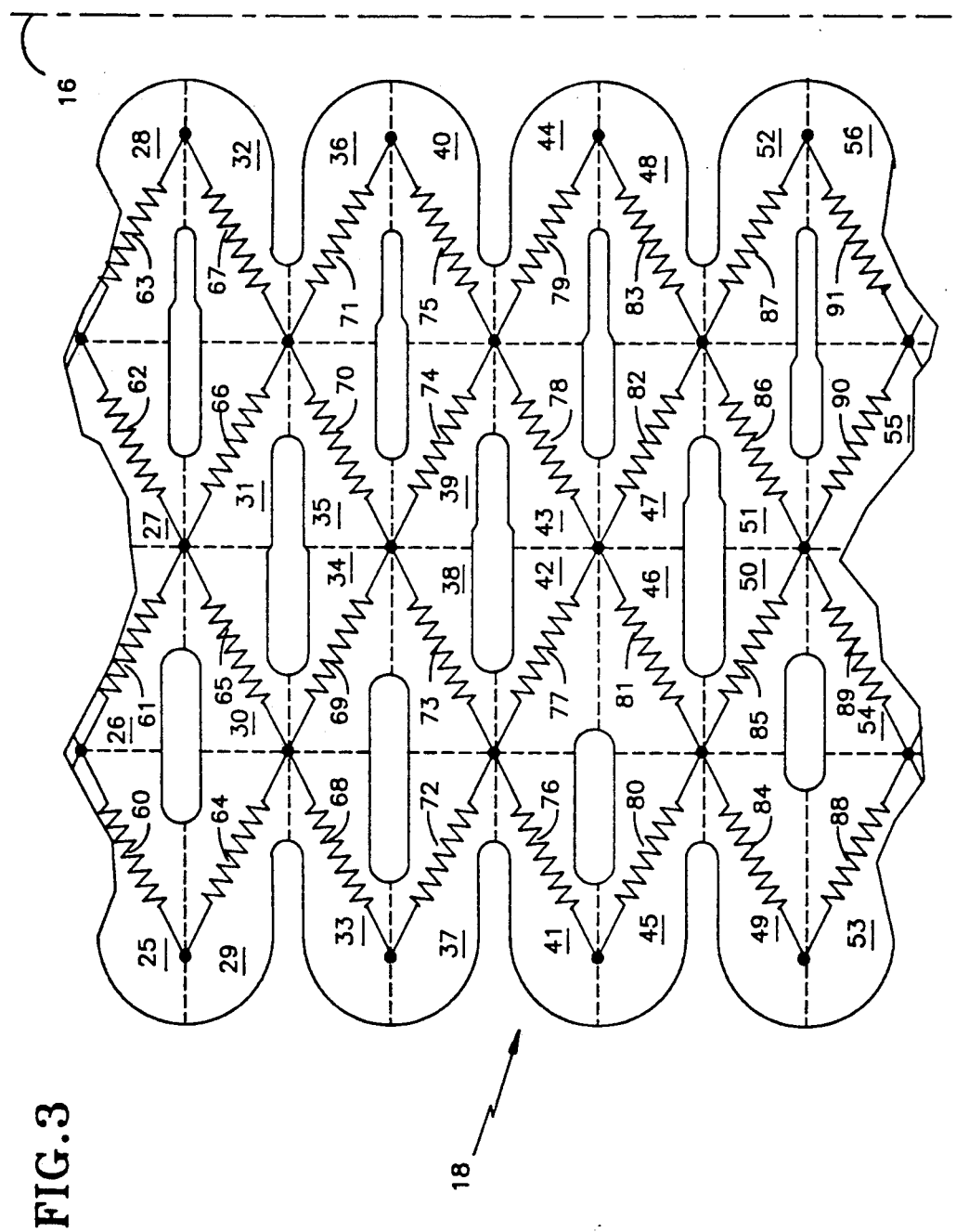
FIG. 3 is a plan view of a portion of a foil pattern of a blade heater according to the invention having a resistive circuit superimposed thereon.

FIG. 3 illustrates that the foil pattern 18 is comprised of a plurality of individual elements 25-56. The circumferential distance between each of the elements 25-56 and the lead axis 16 (and hence from the leading edge 12 of the blade 14) varies so that the element 28 is closer to the lead axis 16 than the element 27, the element 27 is closer to the lead axis 16 than the element 26, etc. Furthermore, the elements 25-28 are farther heater 10 than the elements 29-32, the elements 29-32 are farther from the radially inward most portion of the heater 10 than the elements 33-36, etc.

The amount of electric power consumed, and hence the amount of heat dissipated, by each of the elements 25-56 varies according to the position of each element. Elements which are farther from the lead axis 16 consume less electric power than elements which are closer to the lead axis 16. Elements which are farther from the radially inward most portion of the blade 14 consume less power than elements which are closer to the radially inward most portion of the blade 14.

The power consumed by each of the elements 25-56 is determined by the electrical resistance (R) of each of the elements 25-56, which can be calculated in terms of element resistivity, length, width, and thickness by the following equation (EQ. 1):

$$R = (resistivity \times length)/(width \times thickness)$$

The resistivity of the copper-nickel alloy is a constant $192 \times 10^{-7}$; ohm-inch. The thickness of the elements 25-56 is a constant 0.002 inches. Combining the constants and rearranging terms yields the equation (EQ. 2):

$$length/width = R/(96 \times 10^{-4})$$

The electrical resistance of each of the elements 25-56 is determined by modeling the elements 25-56 as a plurality of resistors 60-91 arranged in a circuit wherein each one of said resistors 60-91 corresponds to each one of said elements 25-56. The resistor 60 corresponds to the element 25, the resistor 61 corresponds to the element 26, etc.

The desired power dissipation for each of the elements 25-56, and hence for each of the resistors 60-91, is predetermined. Furthermore, the voltage provided to the heater 10 via the heater lead wires 17 is also known. Therefore, basic circuit equations and analysis techniques, known to those skilled in the art, can be used to determine the value of each of the resistors 60-91.

Once the value of each of the resistors 60-91 has been determined, the length and width of each of the elements can be determined by EQ. 2 (above) and by the dimensional constraints of the heater. The actual values for the voltage supplied to the heater 10, the power dissipation of the elements 25-56, etc. vary depending upon the particular application and can be determined by those skilled in the art.

Even though the invention has been illustrated by varying the power dissipated by the elements 25-56 in two directions, the invention can be practiced by varying the power dissipated by the elements 25-56 only according to the distance of the elements 25-56 from the leading edge 12 of the blade 14 and not according to the radial distances. Although the foil pattern 18 is illustrated as a 0.002 inch layer of a 45 percent copper/55 percent nickel alloy, the thickness of the foil pattern 18 may be varied and other materials, such as stainless steel, a copper/nickel alloy containing different proportions of copper and nickel, or even non-metallic resistive materials, may be used so long as the relationship between material resistivity and element thickness, length, and width provides for varying the power dissipated by the elements according to the distance of the elements from the leading edge 12 of the blade 14. Materials other than nylon and neoprene can be used to reinforce the foil pattern 18 as long as the material which is bonded to the foil pattern 18 is essentially electrically non-conductive.

Even though the heater 10 is shown as a distinct unit which is bonded to the blade 14 during the manufacturing process, the heater 10, or just the foil pattern 18, may be embedded into a blade which is comprised of an essentially electrically non-conductive material. The exact shapes of the elements 25-56 can be modified without departing from the spirit and scope of the invention as long as the resistance of each of the elements 25-56 provides for variable power dissipation of the elements 25-56 according to the distance of the elements 25-56 from the leading edge 12 of the blade 14.

Although the invention has been shown and described with respect to exemplary embodiments thereof, it should be understood by those skilled in the art that various changes, omissions and additions may be made therein and thereto, without departing from the spirit and the scope of the invention.

We claim:

1. A blade heater, for deicing an aircraft engine propulsor blade, comprising a plurality of elements, wherein said elements are comprised of metallic foil and each of said elements is electrically attached exclusively to radially and circumferentially adjacent other ones of said elements and wherein the heat dissipated by each of said elements varies according to the thickness, width, length and resistivity of each of said elements according to the distance between each of said elements and the leading edge of the blade and according to the distance between each of said elements and the radially inward most portion of the blade.

2. A blade heater, for deicing an aircraft engine propulsor blade, according to claim 1, further comprising a layer of mechanically reinforcing, electrically non-conductive, material fixedly attached to said metallic foil.

3. A blade heater, for deicing an aircraft engine propulsor blade, according to claim 2, wherein said metallic foil is comprised of an alloy having 45 percent copper and 55 percent nickel.

4. A blade heater, for deicing an aircraft engine propulsor blade, according to claim 2, wherein said metallic foil is comprised of stainless steel.

* * * * *